United States Patent [19]

Fritz

[11] 3,879,691

[45] Apr. 22, 1975

[54] PLUGGABLE FILTER UNIT

[75] Inventor: William Baird Fritz, Hershey, Pa.

[73] Assignee: AMP Incorporated, Harrisburg, Pa.

[22] Filed: Oct. 3, 1973

[21] Appl. No.: 402,938

Related U.S. Application Data

[63] Continuation of Ser. No. 266,868, June 28, 1972, abandoned, which is a continuation-in-part of Ser. No. 166,899, July 28, 1971, abandoned.

[52] U.S. Cl. .................. 333/79; 333/70; 339/147 P

[51] Int. Cl. .................. H01h 7/14

[58] Field of Search...333/79, 70; 339/14 R, 176 MP, 339/147 P

[56] References Cited

UNITED STATES PATENTS

| | | | |
|---|---|---|---|
| 3,539,954 | 11/1970 | Camire | 333/79 |
| 3,579,155 | 5/1971 | Tuchto et al. | 333/79 |
| 3,588,758 | 6/1971 | Hurst | 333/79 |
| 3,603,902 | 9/1971 | Denes | 333/79 |
| 3,638,144 | 1/1972 | Denes | 333/79 |

*Primary Examiner*—James W. Lawrence
*Assistant Examiner*—Saxfield Chatmon, Jr.
*Attorney, Agent, or Firm*—Gerald K. Kita

[57] ABSTRACT

A filter unit is disclosed as comprising a discoidal capacitor, a toroidal inductor, and a lossy ceramic filter component, all of which are disposed within a metal case. The filter network is electrically connected to connector pins at both ends of the metal case. In order to compensate for high frequency resonances in the capacitor and inductor which are lumped L-C elements, the said lossy ceramic filter is inserted in one end of the metal case. The pin at the one end extends through this lossy ceramic filter, which may be of a tubular shape, and is in electrical contact with an inner conductive surface thereof. The outer conductive surface of the lossy filter is in electrical contact with the metal case.

17 Claims, 8 Drawing Figures

PLUGGABLE FILTER UNIT

RELATED APPLICATIONS

This application is a continuation of application Ser. No. 266,868, filed June 28, 1972, which is a continuation-in part of Ser. No. 166,899, titled "Pluggable Filter Unit," filed July 28, 1971, both abandoned.

BACKGROUND OF THE INVENTION

This invention relates to filter units that must operate over a wide frequency range. More particularly, it relates to a filter unit having a lossy ceramic filter component which compensates for high frequency resonances which might otherwise be present in an L-C lumped element type of filter.

Small, easily connected, filter units are used in many applications. U.S. Pat. No. 2,759,155 - Hackenberg shows one such unit with electrical connectors at both ends. The units include an inductor and a capacitor connected to form a filter between the connectors. While such units are suitable for most applications, at higher frequencies the combination of the stray inductance of the capacitor and the stray capacitance of the inductor may produce undesired resonance.

Ceramic filters of the type shown in U.S. Pat. No. 3,275,953 - Coda, et al., have been developed and used as feed through filters or on connector pins. These filters are small and have good insertion loss characteristics at high frequencies.

SUMMARY OF THE INVENTION

In accordance with this invention, a tubular lossy ceramic filter component of the type described in the aforesaid Fritz application is inserted in one end of a pluggable filter unit. At high frequencies this ceramic filter compensates for the resonance caused by the lumped L-C components of the filter unit.

Further in accordance with this invention a particularly compact filter unit having the desired electrical characteristics is constructed by inserting the ceramic filter in one end of the filter unit case with the connector pin extending through the tubular ceramic filter. A discoidal capacitor forms the closure of the other end of the case with another connector pin extending through the discoidal capacitor. A toroidal inductor is connected between the two connector pins.

The foregoing and other objects, features and advantages of the invention will be better understood from the following more detailed description and appended claims.

DESCRIPTION OF A PARTICULAR EMBODIMENT

Figure 1:
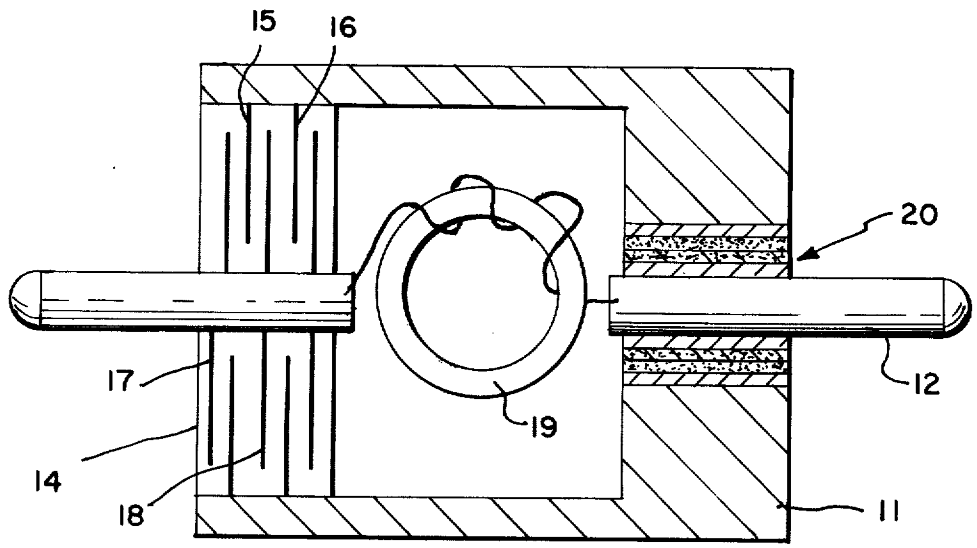
FIG. 1 is a longitudinal cross-section of the filter unit.

Referring now to FIG. 1, the filter unit includes a brass case 11 which has been silver plated and is therefore electrically conductive. A first conductive pin 12 is in one end of the case and a second conductive pin 13 forms the electrical connector at the other end of the case.

A discoidal capacitor 14 forms the closure for said other end of the case. The capacitor includes interleaved plates which are separated by dielectric material. Alternate plates 15, 16 and other corresponding plates are electrically connected to an outer conductive surface of the capacitor. This outer conductive surface is in electrical contact with the metal case 11. The discoidal capacitor has a hole through the middle with a conductive surface around the hole. The remaining plates 17, 18 and others are connected to this inner conductive surface. The pin 13 is inserted in the hole.

One example of a discoidal capacitor is shown in the Garstang, et al., U.S. Pat. No. 3,443,251. Particularly suitable discoidal capacitors are available from U.S. Capacitor Company.

A toroidal inductor 19 is connected between the pins 12 and 13. One inductor which is suitable for use is the Indiana General Toroid CS-101-06 having the appropriate number of turns as determined by the application involved.

In accordance with the present invention, a lossy ceramic filter component 20 is incorporated into the filter unit, the filter component 20 preferably having the construction described more fully in the aforementioned Fritz application Ser. No. 883,501. As will be seen hereinafter, the filter component 20 is a distributed impedance device with multiple ground return paths. The tubular ceramic filter 20 is inserted in a hole in case 11 with the pin 12 extending therethrough as depicted in the drawing.

Figure 2:
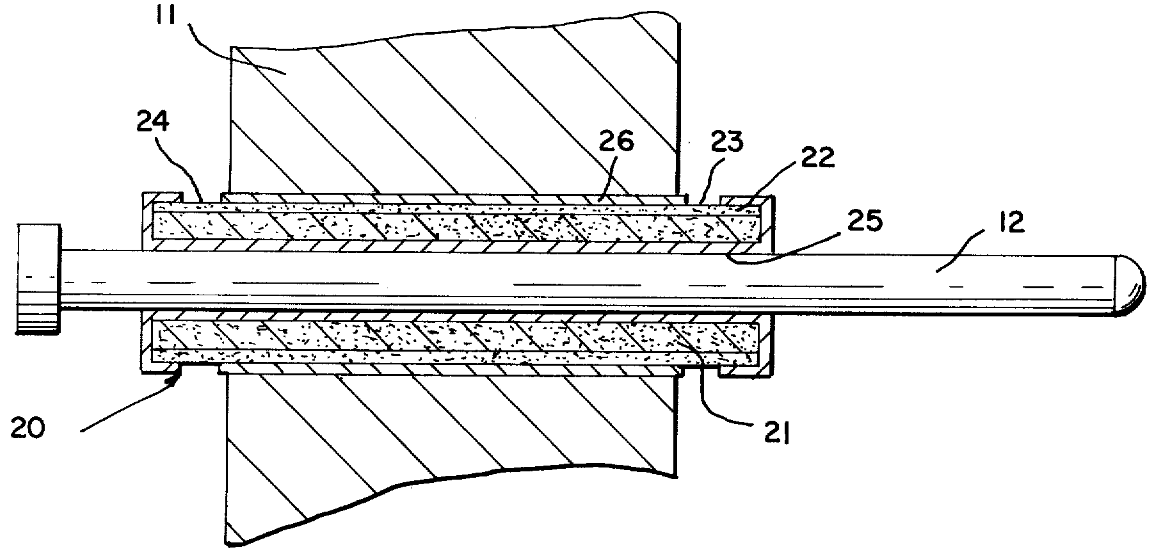
FIG. 2 illustrates the tubular ceramic filter in more detail.

In FIG. 2 the structure of the filter device 20 is shown in more detail. An extruded ferrite tube 21 is the filter substrate. A coating of barium titanate 22 deposited on the ferrite forms the dielectric layer. The multi-layer filter component 20 has an outer metallic plating thereon. The gaps at 23 and 24 in the metallic plating electrically isolate the plating into an inner conductive surface 25 and an outer conductive surface 26. The outer conductive surface is in electrical contact with the case 11 and the inner conductive surface is in electrical contact with the pin 12.

Figure 3B:
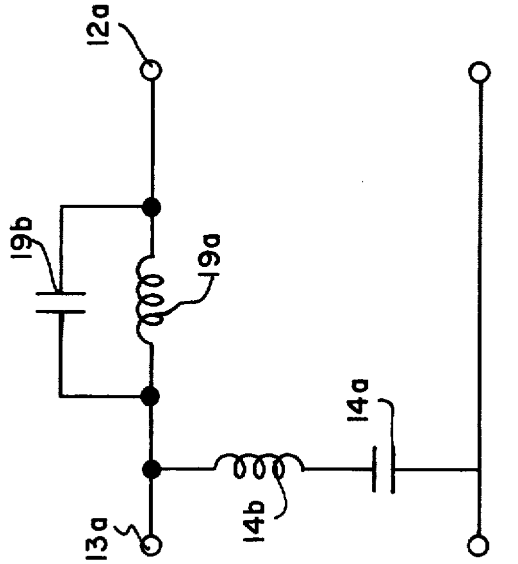
FIG. 3*b* shows the equivalent circuit with the high frequency stray inductance and capacitance of the components.
Figure 3A:
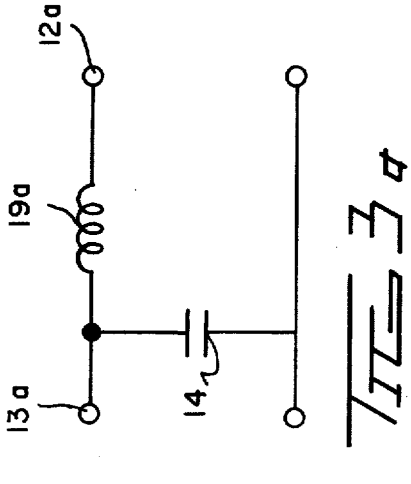
FIG. 3*a* shows the desired equivalent circuit of the filter unit.

FIG. 3*a* shows the desired equivalent circuit of such a filter with the points 12*a* and 13*a* representing the electrical equivalent of the pins 12 and 13 respectively. Capacitance 14*a* is the capacitance of capacitor 14 and 19*a* is the inductance of inductor 19.

Unfortunately, at high frequencies the capacitor 14 has stray inductance and the inductor 19 has stray capacitance. As a result the actual equivalent circuit more nearly resembles that shown in FIG. 3*b*. Inductance 14*b* depicts the high frequency stray inductance of capacitor 14 and 19*b* is the stray high frequency capacitance of inductor 19. This combination produces resonance at high frequencies. However, by inserting the ceramic filter component 20 in the circuit, an equivalent circuit similar to that depicted in FIG. 3*c* is obtained.

Figure 3C:
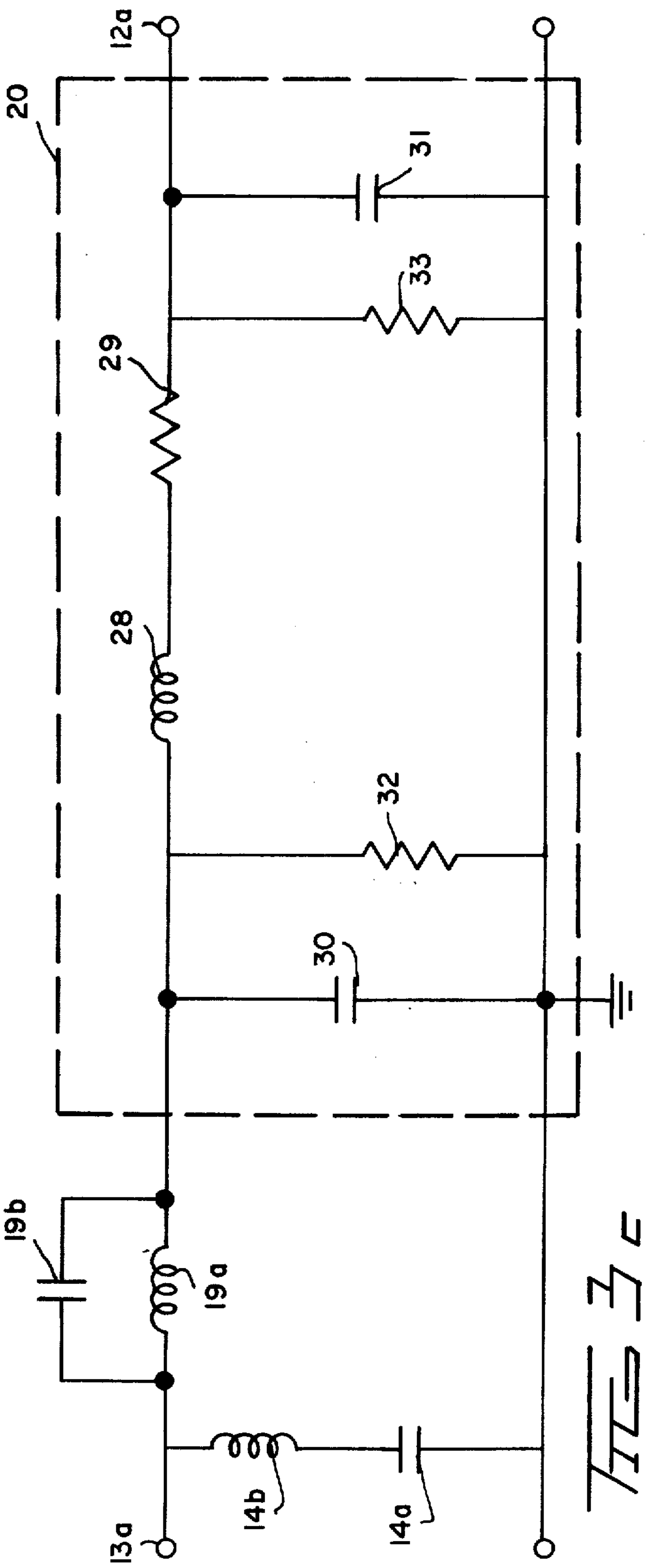
FIG. 3*c* shows the equivalent circuit of an L-type unit with the tubular ceramic filter.

The equivalent circuit of FIG. 3*c* shows the effects of combining the distributed filter device 20 with the lumped components 14 and 19, in accordance with the invention. The equivalent circuit now comprises the circuitry of FIG. 3*b* together with further elements including an inductance 28 and resistance 29 established by the complex permeability of the ferrite tube 21. In addition, capacitances 30 and 31 and resistors 32 and 33 are shown which represent the path between the pin and the outer conductive surface 26. The magnitudes of these capacitances and resistances are determined by the complex permitivity of the barium titanate-ferrite composite of the lossy filter 20. FIG. 3*c* depicts lumped impedances with only two ground return paths. Actually, the impedances are distributed with continuous ground return paths along the length of the pin 12. In actuality the filter network of the invention is equivalent to a lossy transmission line and therefore has extremely desirable filter characteristics over a wide frequency range (10 MHz to 12 GHz).

Figure 4:
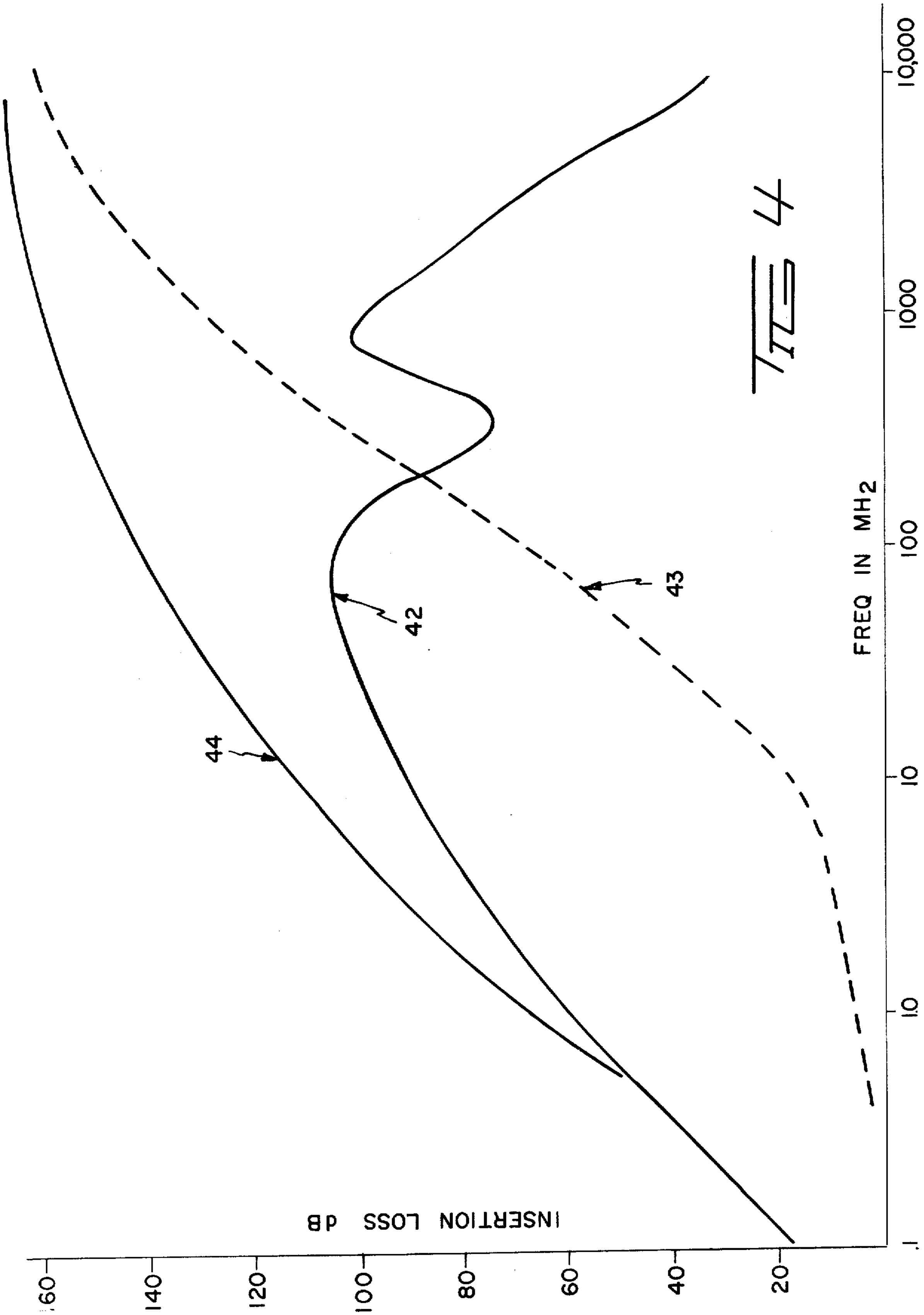
FIG. 4 depicts the insertion loss characteristics of a normal filter unit, a ceramic tubular filter and a filter unit with the ceramic tubular surface in place.

FIG. 4 shows the typical insertion loss characteristics for an L-C filter by curve 42 (with resonances), for a lossy ceramic filter component 20 alone by means of the curve 43, and for the filter network of this invention by means of the curve 44. Note that the resonances depicted by the curve 42, as well as the decrease in insertion loss at high frequencies, are not present in the filter of the invention.

Figure 5:
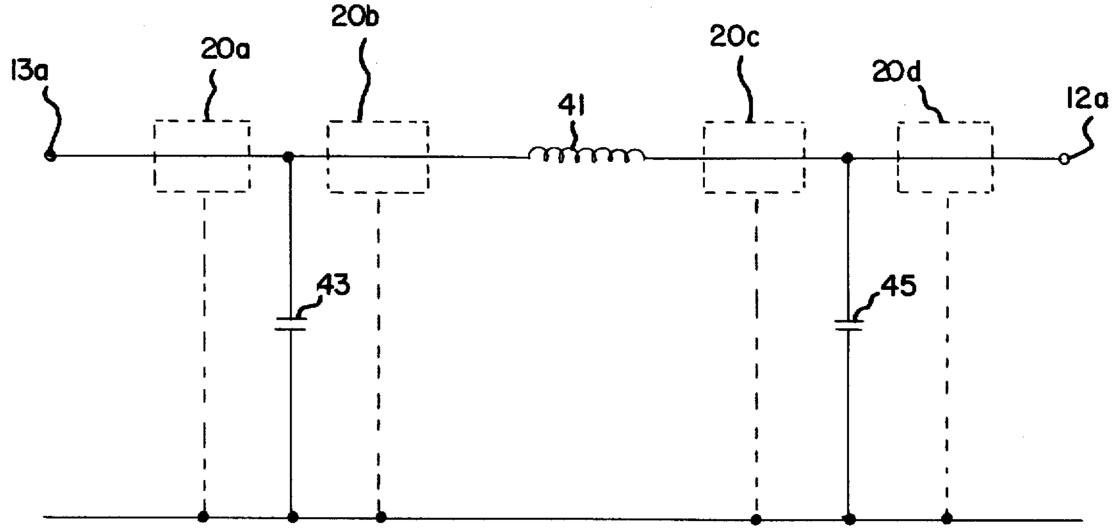
FIG. 5 shows the equivalent circuit of a Pi-type unit with tubular ceramic filter.

Referring now to FIG. 5, there is shown a typical Pi-filter which is understood to have the same stray capacitance in parallel with inductor 41 and stray inductance in series with capacitors 43 and 45 as described with respect to FIG. 3*b*. The filter of FIG. 5 is connected across pins 12 and 13. The filter of FIG. 5 could be constructed in the same manner as the filter of FIG. 1 with an additional capacitor identical to capacitor 14 on the opposite side of inductor 19. The ceramic filter 20 of FIGS. 1 and 2 can be positioned in any of the four locations indicated by boxes 20 in phantom in FIG. 5.

In the case of box 20*a*, the pin 13 and case 11 of FIG. 1 would be extended to the left with the filter 20 located to the left of capacitor 14 rather than as shown in FIG. 1. For the case of box 20*b*, the filter would be placed on the pin 13 to the right of capacitor 14. In the case of box 20*c*, the filter 20 would be placed on pin 12 to the left of a capacitor similar to capacitor 14 but positioned where filter 20 is shown in FIG. 1. In the case of box 20*d*, the filter 20 would be placed on pin 12 to the right of the capacitor depicted with respect to box 20*c*. In this way, a Pi-filter is provided having good insertion loss characteristics over a wide range.

Figure 6:
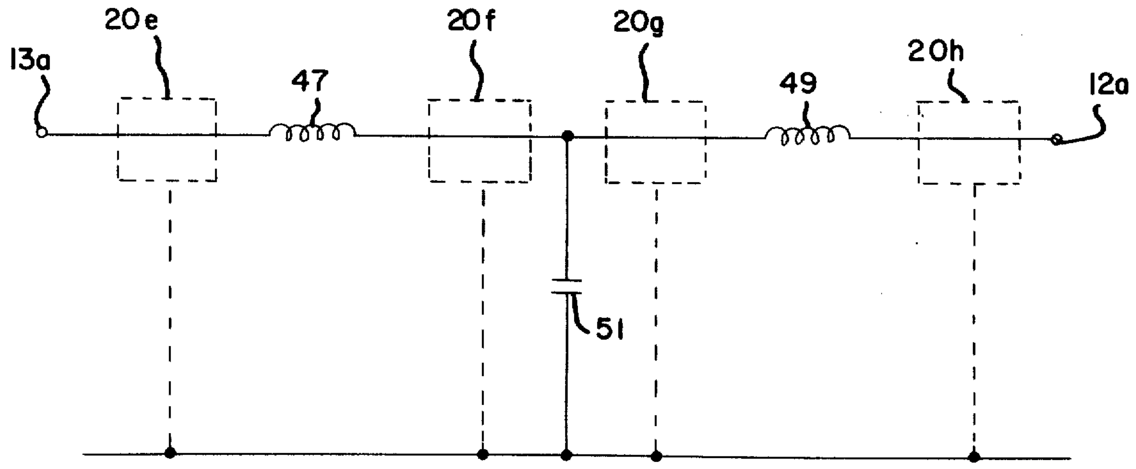
FIG. 6 shows the equivalent circuit of a T-type unit with tubular ceramic filter.

Referring now to FIG. 6, there is shown a typical T-filter which is understood to have the same stray capacitance in parallel with inductors 47 and 49 and stray inductance in series with capacitor 51 as described with respect to FIG. 3*b*. The filter of FIG. 6 is connected across pins 12 and 13. The filter of FIG. 6 could be constructed in the same manner as the filter of FIG. 1 with an additional inductor identical to inductor 19 on the opposite side of capacitor 14. The ceramic filter 20 of FIGS. 1 and 2 can be positioned in any of the four locations indicated by boxes 20 in FIG. 6.

In the case of box 20*e*, a further portion of case 11 to the left of capacitor 14 would be provided with a second inductor and a pin and filter as shown in FIG. 1 would be placed to the left of the inductor in the case 11. In the case of box 20*f*, the construction would be the same as for box 20*e* with the filter positioned on a pin to the left of capacitor 14. In the case of box 20*g* the filter would be placed on the pin to the right of the capacitor 14 and to the left of inductor 19. In the case of box 20*h*, the filter would be positioned as shown in FIG. 1. In this way, a T-filter is provided having good insertion loss characteristics over a wide range.

Referring again to the embodiments of FIG. 5, the case 11 can either have a further capacitor placed therein similar to capacitor 14 but in the right hand wall of the case or the further capacitor may be formed in a separate case with a pin passing therethrough. In the event a separate case is used, the filter 20 can be placed in the pin on either side of the capacitor, it being understood that the pin passes through the filter as described in FIGS. 1 and 2 and the filter is in contact with the case. Upon forming the Pi-filter, the two cases would be placed together in electrical contact and preferably made integral with each other.

Referring again to the embodiment of FIG. 6, the case 11 can have either a further cavity to the left of capacitor 14 to house a further inductor or a separate case can be provided which houses a second inductor. One side wall of the separate case would have a terminal therein and another side wall would have a pin with the filter 20 thereon as shown in FIGS. 1 and 2. The filter would take the position of 20*g* or 20*h*, depending upon whether the terminal side or the pin side of the case faces inwardly into the mating case which contains the other inductor and capacitor. The two cases would be electrically connected together and preferably made integral with each other.

While particular embodiments of the invention have been shown and described, it will be understood that various modifications are within the scope of the invention. Thus, for example, it will be readily seen that the discoidal capacitor 14 could be replaced by any other suitable capacitance means, such as cylindrical capacitors or capacitors of the wound type. Similarly, the inductor 19 need not necessarily be a toroidal inductor. Instead it could be a tubular inductor, one having a wound coil construction, or one with a potted core. The connector pins 12 and 13 could also be replaced by any equivalent desired electrical connector means or circuit termination means.

What is claimed is:

1. A pluggable filter unit comprising:

an electrically conductive case having plural outer walls, at least one capacitor within said case and having one side electrically connected to said case, at least one inductor within said case and electrically connected to the other side of said capacitor, said at least one capacitor and at least one inductor being connected to form one of an L-type, T-type and Pi-type filter, a first conductive pin in one of said outer walls of said case and an electrical terminal at the other end region of said case, and, lossy filter means in said one of said outer walls of said case, said pin extending through said lossy filter means and being in electrical contact with an inner conductive surface of said filter means, an outer conductive surface of said filter means being in electrical contract with said case, with said inductor, said capacitor and said lossy filter means being connected as a high frequency insertion loss filter network between said pin and said terminal.

2. The filter unit recited in claim 1 wherein said lossy filter means comprises a tubular ceramic filter including:

a tube of substrate, a dielectric coating on said tube, a metal plating on said dielectric, a portion of which forms the outer conductive surface of said filter, said filter being inserted in a hole in said one end of said case with said outer conductive surface in contact with said case, and the said metal plating being extended throughout the inside of said tubular ceramic filter and having gaps near both extremities of said filter to electrically isolate the portion of said plating which forms said outer conductive surface from another portion of said plating which forms said inner conductive surface.

3. The filter unit recited in claim 2 wherein said tube is an extruded tube of ferrite.

4. The filter unit recited in claim 3 wherein said dielectric is a coating of barium titanate on said tube of ferrite.

5. The filter unit recited in claim 1 wherein said at least one capacitor is a discoidal capacitor having interleaved plates separated by dielectric, alternate plates being electrically connected to an outer surface of said capacitor which is in electrical contact with said case, the other plates being electrically connected to said electrical connector.

6. The filter unit recited in claim 5 wherein said electrical connector is a second conductive pin and wherein said discoidal capacitor is of the type having a hole in the middle, said second pin being inserted in said hole, said other plates being electrically connected to an inner conductive surface in said hole which is in electrical contact with said second pin.

7. The filter unit recited in claim 6 wherein said discoidal capacitor forms the closure of at least one end of the case.

8. The filter unit recited in claim 1 wherein said connector is a second conductive pin and wherein said inductor is a toroidal inductor electrically connected between said first pin and said second pin.

9. A filter unit comprising:

an electrically conductive case having a hollow interior, capacitance means disposed within said hollow interior of said case, inductive means disposed within said hollow interior of said case and electrically connected to said capacitance means, electrical connector means mounted in and extending through said case and providing input and output connections for said filter unit, lossy filter means mounted in and extending through said case with at least a portion of said electrical connector means extending through said lossy filter means and being in electrical contact with an inner conductive surface thereof, an outer conductive surface of said lossy filter means being in electrical contact with said case, and means for connecting said capacitance means, said inductive means, and said lossy filter means together to form a high frequency insertion loss filter network.

10. The filter unit recited in claim 9 wherein said capacitance means comprises two capacitors arranged in Pi-filter configuration with said inductance means.

11. The filter unit recited in claim 9 wherein said inductance means comprises two inductors arranged in a T-filter configuration with said capacitance means.

12. A low phase broad band feed-through line filter assembly which comprises:

a. a unitary casing support of electrically conductive material, b. low frequency filter means providing filtering of frequencies in the range of about 1 megahertz to about 20 megahertz with rapid fall off of filtering capability, c. a tubular ceramic high frequency lossy filter surrounded by said casing and having distributed impedance in series with said low frequency filter means providing filtering of frequencies from 10 10 megahertz to about 12 gigahertz, d. whereby said lossy filter cancels resonances from said low frequency filter means in the range of about 20 megahertz to about 12 gigahertz; and e. a connector pin extendng through said tubular filter substantially along the axis thereof, said connector pin extending externally of said casing support;

f. substantially the entire outer surface of the tubular ceramic filter being conductively connected to the casing support.

13. A filter assembly as set forth in claim 12 wherein said connector pin is electrically insulated from said casing support.

14. A low pass broad band line filter as set forth in claim 12 wherein said filter means is a capacitor.

15. A low pass broad band line filter as set forth in claim 13 wherein said filter means is a capacitor.

16. A low pass broad band line filter as set forth in claim 12 wherein said filter means is a coil and a capacitor.

17. A low pass broad band line filter as set forth in claim 13 wherein said filter means is a coil and a capacitor.

* * * * *